2,791,589

PROCESS FOR THE PRODUCTION OF FINELY DISPERSED PHTHALOCYANINE PIGMENTS WHICH ARE STABLE IN SOLVENTS

André Pugin, Basel, Switzerland, assignor to J. R. Geigy A. G., Basel, Switzerland, a Swiss firm No Drawing. Application September 7, 1954, Serial No. 454,636

Claims priority, application Switzerland September 16, 1953

7 Claims. (Cl. 260—314.5)

The present invention concerns the production of finely dispersed phthalocyanine pigments of high tinting strength which are stable in solvents. They are obtained from raw or precipitated low halogenated metal-free or copper-, cobalt- or nickel-containing phthalocyanines or from such phthalocyanines containing no halogen, by grinding in the presence of inert substances to facilitate milling, which substances can be removed easily.

As is known, copper phthalocyanine containing no halogen is obtained in the crystalline, coarsely crystallised β-form when produced according to the usual processes. This pigment cannot be converted into finely dispersed β-form of high tinting strength by grinding either with or without solid grinding substrata. For some time now, in order to produce pigment dyestuffs the particles of which are of a suitable size for use, the raw copper phthalocyanine has been dissolved in sulphuric acid of a content of 70–100% and then the finely dispersed α-form of high tinting strength has been obtained by pouring this solution into water. This method has the great disadvantage that the product is metastable and when it comes into contact with certain liquid organic solvents, it returns to the coarsely crystallised β-form, more slowly when standing at a usual temperature and more quickly when warm. During this conversion, there is a considerable loss in tinting strength or depth of shade. In particular, because of a certain capability to dissolve the α-form, liquid hydrocarbons such as toluene, ethyl benzene and xylene which are extensively used as solvents and diluents in lacquers and paints cause the pigments to recrystallise relatively quickly into the coarse, weak β-form, so that their use is greatly limited. In addition the change in modification in cellulose ester lacquers causes an undesirable flocculation accompanied by a disturbing change in the viscosity which thus causes a thickening, so that it is impossible to store lacquers dyed in this manner.

Newer processes overcome these disadvantages by first attaining a finely dispersed α-modification by very fine grinding or precipitating from raw copper phthalocyanine and then converting this by suitable means into a finely dispersed form of the stable β-modification. This is done by bringing the finely dispersed α-modification into contact with a liquid organic solvent capable of converting it into the β-form, the contact being limited both in time and amount so that a too far-going growth of crystals cannot occur. After again grinding, it is advantageous to repeat this process. In contrast to the laborious performance of the process in steps, it was regarded as a great technical advance when it was found that the fine grinding in the presence of substrata, such as e. g. inorganic salts, and the conversion into the stable β-modification could be performed in one process if non-ionogenic liquid organic solvents were added to the solid material to be ground, in such slight amounts that a pulverulent mixture resulted. Copper phthalocyanine pigments of high tinting strength which are stable to solvents are thus obtained, particularly if milling is performed at a raised temperature, after removal of the milling substrata. As liquid organic solvents which facilitate the conversion of the α- into the β-modification, low alcohols, ketones, esters, aldehydes, chiefly however, liquid aliphatic, alicyclic or aromatic hydrocarbons such as hexane, cyclohexane, toluene, ethyl benzene and xylenes have been suggested. These should be anhydrous and should boil at under 200°, preferably under 150°.

These more recent processes also have heavy disadvantages in practice. There is a great danger of fire or explosion when manipulating particularly larger quantities of the milling powders which are heated by the friction and which have absorbed liquid, very volatile and inflammable organic solvents. It is necessary therefore, to work with closed vessels, sometimes with long waiting periods, or the working up of the mixture must be done in milling rooms which are fitted with particular safety devices which necessitates very costly installations and adversely affects the productivity of the mills.

In contrast to the present theories regarding the conversion of the α- into the β-modification of copper phthalocyanine, it has now been found that it is not necessary to use liquid organic solvents of the type described above. That is, it has been found that finely dispersed phthalocyanine pigments of high tinting strength which are stable to solvents can also be obtained if raw or precipitated halogen-free or low halogenated metal-free or copper-, cobalt- or nickel-containing phthalocyanine is milled in the presence of, preferably, practically anhydrous salts, with solid, aromatic or araliphatic hydrocarbons or solid derivatives thereof which are derived from the basic hydrocarbon by the replacement of a single to at most the half of the aromatically bound hydrogen atoms by halogen, nitro or ether groups. After attaining the desired degree of fineness, the milling substrata are removed, if necessary with the aid of solvents. Halogen-free and low halogenated metal-free or copper-, cobalt or nickel-containing phthalocyanine, in particular also the monochloro- and monobromo-phthalocyanines in all their forms can be ground without danger according to the new method to produce pigments of high tinting strength which are stable to solvents and do not flocculate in cellulose ester lacquers. Preferably water soluble, practically anhydrous inorganic or organic salts are used as milling substrata, of which it is advantageous to use from twice to five times the amount of the phthalocyanine. For example, anhydrous sodium sulphate, potassium aluminum sulphate, sodium ferrocyanide, barium, calcium or sodium chloride, sodium acetate or carbonate as well as mixtures of these salts can be used. As solid aromatic or araliphatic hydrocarbons, preferably those which are volatile with steam can be used such as, for example, diphenyl, diphenylmethane, naphthalene, methylnaphthalene, anthracene. Naphthalene is to be preferred because it is cheap and can be easily removed with steam. However, solid derivatives of aromatic or araliphatic hydrocarbons can also be used in which a single to at most the half of the aromatically bound hydrogen atoms are replaced by halogen, nitro or ether groups. Preferably the technically cheap chlorine can be used as halogen substituent whilst alkoxy, aralkoxy and aryloxy groups, e. g. methoxy, ethoxy, benzyloxy and phenoxy groups, can be used as ether groups. Examples of such solid substitution products of aromatic and araliphatic hydrocarbons are: 1.4-dichlorobenzene, 1.4-dibromobenzene, 1-chloro-4-bromobenzene, 1.3-dinitrobenzene, 1-chloro-4-nitrobenzene, 1-methyl-4-nitrobenzene, 1.4-dimethoxy or diethoxy benzene, 2-methoxy- or 2-ethoxy-naphthalene, 2-benzyloxy-naphthalene, diphenyl ether. Higher halogenated benzene derivatives such as e. g. tetra-, penta- or hexa-chlorobenzene do not have a stabilising influence on the phthalocyanine pigments.

There is no limit to the amounts of solid aromatic or araliphatic hydrocarbons or the substitution products thereof usable according to this invention to be added to the milling mixtures. The amounts can be for example 10 to 100% by weight of the phthalocyanine; 20 to 50% by weight, calculated on the amount of pigment dyestuff is advantageous. It is also of advantage to use capillary active substances with dispersing properties as well, such as e. g. lauroylhydroxy isopropanol amide, stearic acid or oleic acid monoglyceride, fatty alcohol or alkyl phenol polyglycol ethers, in amounts of 1 to 5% calculated on the amount of phthalocyanine, because this produces pigments of a softer texture. The grinding is performed advantageously in ball mills at slightly raised temperatures of, for example, 30–60°, depending on the heat generated by friction, until the desired particle size has been attained. Because of the slight volatility and also the very slight inflammability of some of the solid organic milling substrata usable according to the present invention, no particular installations or measures need to be taken against danger of fire or explosion, when emptying the mills. The working up of the milled mixtures is extraordinarily simple, e. g. the salts are dissolved with hot water and the solid hydrocarbons or the substitution products thereof are removed either with steam or in another manner according to their volatility and then the pigment dyestuff is filtered off.

The following examples illustrate the invention without limiting it in any way. Parts are given as parts by weight and the temperatures are in degrees centigrade. The relationship of parts by weight to parts by volume is as that of kilogrammes to litres.

Example 1

100 parts of raw copper phthalocyanine (produced from phthalic acid anhydride, urea, copper chloride in the presence of ammonium molybdate by methods known per se), 260 parts of anhydrous calcium chloride, 20 parts of anhydrous sodium acetate, 20 parts of naphthalene and 5 parts of glycerine mono-oleic acid ester are ground together in a ball mill for 100 hours. The mixture is then pasted with 500 parts of water and the naphthalene is distilled off with steam. After filtering, washing and drying, a blue pigment is obtained which is much greener than the product obtained by precipitation from sulphuric acid. It also has a soft texture. X-ray analysis showed a pure β-copper phthalocyanine. After standing for 3 days in toluene at room temperature, it does not recrystallise. The pigment is very stable in lacquers containing solvents and has no tendency to flocculate in nitro lacquers. A sample boiled for 2 hours in toluene when incorporated itno a nitro lacquer has practically no difference in shade and strength from an untreated sample.

Example 2

100 parts of copper phthalocyanine precipitated from sulphuric acid (pure α-form unstable in solvents), 300 parts of anhydrous sodium carbonate, 30 parts of anhydrous sodium acetate, 20 parts of diphenyl, 3 parts of lauroyl isopropanol amide are ground together for 100 hours in a ball mill. After pasting in water, the diphenyl is distilled off with steam, the pigment is filtered off, washed free of salt and dried. It is much greener than the starting product and has excellent stability to solvents. X-ray analysis showed a pure β-copper phthalocyanine.

Similar good results are obtained if, in the above example, the diphenyl is replaced by the same number of parts of p-diphenylmethane or naphthalene.

Example 3

20 parts of monochloro-copper phthalocyanine, 50 parts of anhydrous sodium sulphate, 5 parts of p-dichlorobenzene and 8 parts of anhydrous sodium acetate are ground together for 48 hours in an iron ball mill. The mixture is then distilled with steam, the pigment is filtered off, washed free of salt and dried. It is very stable in lacquers which contain aromatic solvents and has a redder shade than the pigments obtained according to Examples 1 and 2. It is very stable in nitro lacquers and it has no tendency to flocculate.

Similar good results are obtained if, in the above example, the p-dichlorobenzene is replaced by 5 parts of 1.2.3-trichlorobenzene or diphenyl or if metal-free phthalocyanine or cobalt phthalocyanine is used instead of monochloro-copper phthalocyanine.

Example 4

50 parts of metal-free phthalocyanine (produced from sodium phthalocyanine by treatment with methanol), 200 parts of anhydrous calcium chloride, 10 parts of p-nitrotoluene and 2 parts of glycerine mono-oleic acid ester are ground in a ball mill for 48 hours. The mixture is then pasted in 300 parts of water and the p-nitrotoluene is distilled off with steam. After filtering, washing and drying, a blue-green pigment is obtained which is somewhat greener than the starting material. It is very stable in lacquers containing solvents.

Similar good results are obtained if, in the above process, instead of p-nitrotoluene the same number of parts of p-dinitrobenzene or naphthalene are used.

Example 5

20 parts of cobalt phthalocyanine (produced from phthalic acid anhydride, urea, cobalt chloride, in the presence of ammonium molybdate according to known methods), 60 parts of anhydrous sodium carbonate, 5 parts of anhydrous sodium acetate, 5 parts of 2-methoxynaphthalene and 1 part of lauryl isopropanol amide are ground in a ball mill for 60 hours. The mixture is pasted with 200 parts of water and the 2-methoxynaphthalene is distilled off with steam. A blue-green pigment is obtained. It has a soft texture and great tinctorial strength. There is no sign of recrystallisation after boiling for 2 hours in toluene. The pigment is very stable in lacquers containing solvents.

If the 5 parts of methoxynaphthalene are replaced by 6 parts of ethoxynaphthalene or 4 parts of naphthalene, similar good results are obtained.

Example 6

20 parts of a nickel phthalocyanine precipitated from sulphuric acid (produced from phthalic acid anhydride, urea and nickel chloride in the presence of ammonium molybdate according to known methods), 60 parts of anhydrous calcium chloride, 4 parts of anhydrous sodium acetate, 4 parts of 2.3-dimethylnaphthalene, 1 part of glycerin mono-oleic acid ester are ground in a ball mill for 48 hours. The mixture is distilled with steam until there is no more 2.3-dimethylnaphthalene present. After filtering, washing and drying, a blue-green pigment is obtained which has great tinctorial strength and is of a soft texture. It has good stability to solvents and is very well suited for the production of nitro-lacquers.

4 parts of naphthalene can also be used in the above process instead of 2.3-dimethylnaphthalene.

Example 7

20 parts of a nickel phthalocyanine precipitated from sulphuric acid (produced from phthalic acid anhydride, urea and nickel chloride in the presence of ammonium molybdate according to known methods), 60 parts of anhydrous calcium chloride, 4 parts of anhydrous sodium acetate, 4 parts of p-dichlorobenzene, 1 part of glycerine mono-oleic acid ester are ground in a ball mill for 48 hours. The mixture is distilled with steam until no more p-dichlorobenzene is present. After filtering, washing and drying, a blue-green pigment is obtained which has great tinctorial strength and is of a soft texture. It has good stability to solvents and is very well suited for the production of nitro-lacquers.

What I claim is:

1. A method of producing a finely divided, at the most low halogenated phthalocyanine pigment which is stable in organic liquids, which comprises subjecting the pigment to salt-milling in the presence of a solid hydrocarbon selected from the group consisting of unsubstituted aromatic hydrocarbons, unsubstituted araliphatic hydrocarbons and aromatic hydrocarbons containing halogen, nitro, and alkoxy substituents in such a proportion that they do not replace more than half of the aromatically bound hydrogen atoms, and then removing the grinding substrata.

2. A method according to claim 1 in which the solid hydrocarbon is naphthalene.

3. A method of producing a finely divided copper phthalocyanine pigment which is stable in organic liquids, comprising subjecting the pigment to salt-milling in the presence of naphthalene and then removing the grinding substrata.

4. A method of producing a finely divided copper phthalocyanine pigment which is stable in organic liquids comprising subjecting the pigment to salt-milling in the presence of diphenyl and then removing the grinding substrata.

5. A method of producing a finely divided nickel phthalocyanine pigment which is stable in organic liquids, comprising subjecting the pigment to salt-milling in the presence of p-dichlorobenzene and then removing the grinding substrata.

6. A method of producing a finely divided metal-free phthalocyanine pigment which is stable in organic liquids comprising subjecting the pigment to salt-milling in the presence of p-nitrotoluene and then removing the grinding substrata.

7. A method of producing a finely divided cobalt phthalocyanine pigment which is stable in organic liquids, comprising subjecting the pigment to salt-milling in the presence of naphthalene and then removing the grinding substrata.

References Cited in the file of this patent
UNITED STATES PATENTS

| | | |
|---|---|---|
| 2,486,304 | Loukomsky | Oct. 25, 1949 |
| 2,486,351 | Wiswall | Oct. 25, 1949 |
| 2,540,775 | Brouillard et al. | Feb. 6, 1951 |